(12) United States Patent
Angelo

(10) Patent No.: US 7,167,987 B2
(45) Date of Patent: Jan. 23, 2007

(54) USE OF BIOMETRICS TO PROVIDE PHYSICAL AND LOGIC ACCESS TO COMPUTER DEVICES

(75) Inventor: Michael F. Angelo, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 674 days.

(21) Appl. No.: 09/942,352

(22) Filed: Aug. 29, 2001

(65) Prior Publication Data

US 2003/0046553 A1    Mar. 6, 2003

(51) Int. Cl.
- H04L 9/00 (2006.01)
- H04K 1/00 (2006.01)
- G06F 11/00 (2006.01)
- G08B 13/00 (2006.01)
- G08G 13/00 (2006.01)

(52) U.S. Cl. .................. 713/186; 713/182; 726/34
(58) Field of Classification Search ............... 713/186, 713/166; 70/78; 726/34, 35
See application file for complete search history.

(56) References Cited

U.S. PATENT DOCUMENTS

| | | | | |
|---|---|---|---|---|
| 5,144,659 A | * | 9/1992 | Jones | 713/165 |
| 5,742,683 A | * | 4/1998 | Lee et al. | 705/60 |
| 5,812,356 A | * | 9/1998 | O'Connor | 361/179 |
| 5,859,966 A | * | 1/1999 | Hayman et al. | 713/200 |
| 6,317,834 B1 | * | 11/2001 | Gennaro et al. | 713/186 |
| 6,349,825 B1 | * | 2/2002 | Swinger et al. | 206/320 |
| 6,364,439 B1 | * | 4/2002 | Cedillo | 312/223.6 |
| 6,418,014 B1 | * | 7/2002 | Emerick, Jr. | 361/686 |
| 2001/0049785 A1 | * | 12/2001 | Kawan et al. | 713/156 |

FOREIGN PATENT DOCUMENTS

JP    411229687 A  *  2/1998   ............. 70/1

* cited by examiner

Primary Examiner—Gilberto Barron
Assistant Examiner—Christopher J Brown

(57) ABSTRACT

Biometric sensors are used to control physical and logical access to various computer components or subsystems comprising a computer system. The biometric sensors may comprise fingerprint scanners, iris scanners or any other type of biometric sensor that can uniquely identify a person. The biometric sensors can be used to activate electromagnetic locks, which lock individual components within the system, or enabling locks which prevent devices from receiving power or being enabled (such as disk drives, network cards, etc.).

38 Claims, 1 Drawing Sheet

USE OF BIOMETRICS TO PROVIDE PHYSICAL AND LOGIC ACCESS TO COMPUTER DEVICES

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates generally to computer security. More particularly, the invention relates to security using biometrics. Still more particularly, the invention relates to limiting physical and logic access to computer devices and subsystems based on a user's biometric information.

2. Background of the Invention

Security is a concern for many computer systems, particularly those computer systems that contain sensitive information. Many organizations have large computer systems that include numerous components. Such a large computer system might include, for example, one or more racks that each contains multiple server computers, storage devices, power supplies, switches, communication devices, and other types of computers or computer-related equipment. Each of components generally is removable for maintenance purposes. Accordingly, if a device fails a technician can remove the failed device and install a replacement device.

Two avenues of access to a computer system are possible and both should be secured in some suitable way. One avenue is physical access to the computer system and its various subsystems and components. Often, a lockable access door is provided on the front of a rack to restrict access to the computer components contained within the rack. The door typically requires a physical key. Of course, keys can be misplaced, lost, or stolen thereby potentially frustrating legitimate attempts to gain access to the equipment in the rack. For this reason, sometimes the key is left in the lock, or attached via a string to the cabinet. Although convenient, leaving the key in, or around, the lock renders the lock useless. Further, a person that has a key to the access door then has access to all of the components in the rack, even though that person may never need access to certain components.

The other type of access to computer components is logical access through use of the computer system. This type of access includes, for example, access to storage devices (CD ROM, hard drive, tape drive, etc.). Without proper security mechanisms in place, an unauthorized person may be able to gain access to valuable, sensitive information.

Accordingly, a security mechanism is needed which addresses the shortcomings noted above. The security mechanism should be able to restrict physical and logic access to subsystems or components of a computer system.

BRIEF SUMMARY OF THE INVENTION

The problems noted above are solved in large part by the use of biometric sensors associated with various computer components or subsystems comprising a computer system. The biometric sensors may comprise fingerprint scanners, iris scanners or any other type of biometric sensor, which can be used to uniquely identify a person. The biometric sensors can be used to control physical or logical access to a computer component. For example, a biometric sensor and a lock (e.g., an electromagnetic lock) can be provided as part of, or in conjunction with, a computer component. The component is physically locked in place in a rack, for example, and is removed only by those people who are verified through the biometric sensor. If the person is verified, the lock is unlocked and the component can be removed, otherwise, the lock remains locked.

In another embodiment, use of the various computer components can be controlled using the biometric sensors. For example, the system can be configured so that certain devices can be accessed for read and/or write translations based on a user's biometric credentials. For instance, when a person installs a storage device in a computer system, the drive itself or other logic in the system will prompt the user to use an associated biometric sensor. The drive will become accessible only if the user is successfully authenticated. Alternatively, when a software program needs to access a storage device, program execution will prompt a user to use a biometric sensor, and the program will access the storage device only if the person is successfully verified. Some persons may be granted access to some storage devices while others are granted access to other storage devices. Further, access to other types of computer components, such as network monitor stations, can be controlled through the use of biometrics.

For a person to be able to use the biometric security system, the person must be registered. The registration process includes acquiring a sample biometric image and storing that image (or a template derived therefrom) in a registry. Each registrant can then be granted logical or physical access to only certain, or all, of the computer components comprising the system.

As described herein, biometrics are used to control physical and logical access to components and capabilities within a computer system to increase security. These and other advantages will become apparent upon reviewing the following disclosures.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component and sub-components by different names. This document does not intend to distinguish between components that differ in name but not function. In the following discussion and in the claims, the terms "including" and "comprising" are used in an open-ended fashion, and thus should be interpreted to mean "including, but not limited to . . .". Also, the term "couple" or "couples" is intended to mean either a direct or indirect electrical connection. Thus, if a first device couples to a second device, that connection may be through a direct electrical connection, or through an indirect electrical connection via other devices and connections. To the extent that any term is not specially defined in this specification, the intent is that the term is to be given its plain and ordinary meaning.

DETAILED DESCRIPTION OF THE PREFERRED EMBODIMENTS

The aforementioned problems have been solved through the use of biometric sensors to restrict physical and logic access to computer system resources. A biometric sensor is one that is sensitive to some aspect of a human being. Examples of biometric sensors include fingerprint scanners, iris scanners, voice recognition devices, etc. The use of biometric sensors to restrict physical access to a computer device will be described first followed by the use of biometric sensors to restrict logical access.

In accordance with the preferred embodiments of the invention as shown in the figures and discussed below, biometric sensors and locks are provided on, or with, each computer device or subsystem for which restricted physical access is desired. Each computer device for which restricted access is desired preferably includes a biometric sensor that controls a lock or causes a lock to be controlled. The lock is used to lock the computer component in place to prevent or allow its removal. The lock may comprise an electromagnetic lock, an electromechanical lock or any other type of locking device that can be controlled by an electrical signal. Thus, associated with each computer component to be secured may be a biometric sensor and a lock or a common sensor and multiple locks. Not all components in the computer system need to have a biometric sensor and lock—only those components that should be secured should have the sensor and lock.

Figure 1:
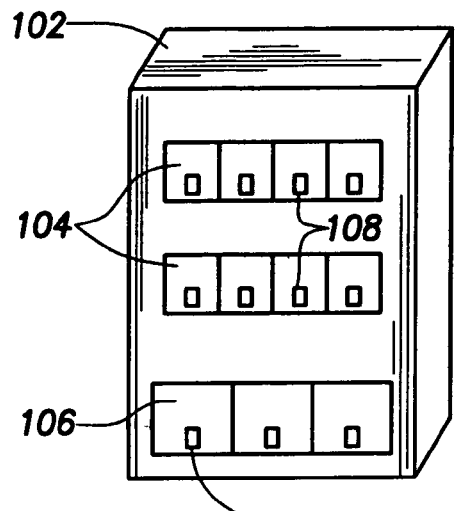
FIG. 1 shows a rack comprising a plurality of computer devices, each device having a biometric sensor.

Referring FIG. 1, for example, a computer system 100 is shown including a rack 102 of computer equipment. The rack 102 may include a plurality of computer equipment such as servers 104. Each server 104 may slide into the rack into the position as shown or otherwise attach to the rack. The rack 102 may also include a plurality of power supply units 106 to provide power to the servers 104. The number of servers 104 and power supplies 110 shown in FIG. 1 are exemplary only and can be varied as desired. Further, other components and subsystems, such as network switches, that are not shown in FIG. 1, can be included. Further still, the computer system 100 need not necessarily be implemented in the form of a rack.

Figure 2:
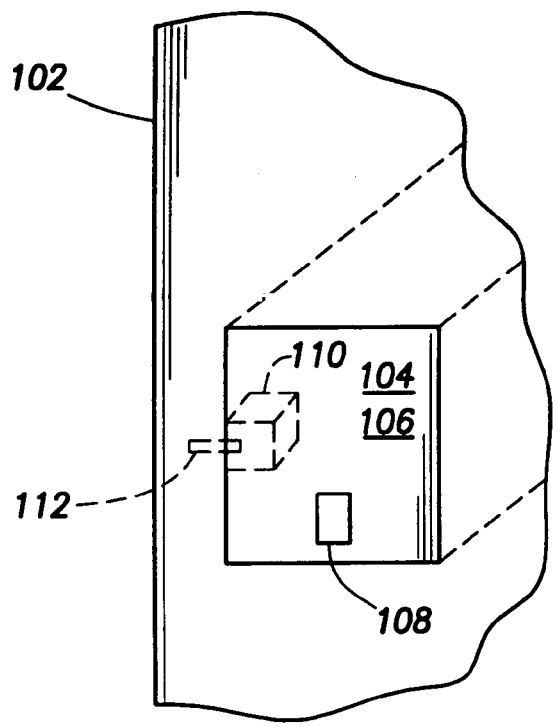
FIG. 2 shows a close-up view of a computer device having a biometric sensor and a corresponding lock.

Referring still to FIG. 1, a biometric sensor 108 is associated with each server 104 and power supply unit 106. Referring to FIG. 2, associated with each sensor 108 is a lock 110 which preferably includes sliding bolt 112 or other type of locking mechanism. The sliding bolt 112 preferably slides through an opening in the structure retaining the computer component in the rack 102. The biometric sensor 108 and lock 110 may be separate components or integrated together into a common package. When it is desired to remove a component (such as server 104 or power supply unit 106), a person activates the biometric sensor 108 associated with the desired computer component. For instance, if the biometric sensor 108 is a fingerprint scanner, the person places his or her finger on the scanner. As explained below, the person is then verified and the lock 110 is caused to unlock by which the sliding bolt 112 retracts into an unlocked position. With the lock 110 in the unlocked position, the computer component can be removed and, if desired, replaced with a new component. The new component can be locked in place without use of the biometric sensor 108 during the normal procedure for installing and initializing the component. The initialization procedure may be set to cause the lock 110 to engage. Alternatively, the newly installed device can be locked using its biometric sensor 108. Thus, if desired, each time the biometric sensor 108 is activated, its associated lock 110 will change from the lock to the unlock state and vice versa.

Generally, any type of biometric sensor 108 is acceptable. Examples include the Optical or capacitive finger print scanners provided by Identix or Authentec and the iris scanner provided by Iriscan is acceptable.

Figure 3:
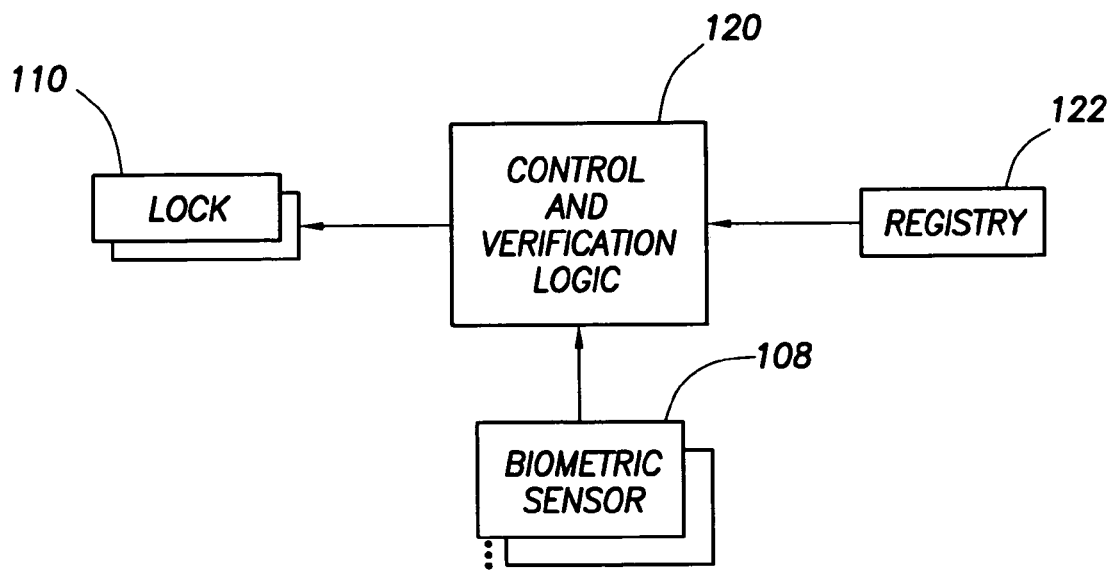
FIG. 3 shows a block diagram of the biometric security system described herein.

Referring now to FIG. 3, a control and verification logic unit 120 preferably is included in the computer system 100. As shown, the control and verification logic 120 couples to one or more biometric sensors 108 and locks 110. The control and verification logic 120 may be provided as logic in each computer device that has a sensor 108 and lock 110. In this embodiment, the control and verification logic 120 preferably is coupled to a single biometric sensor 108 and lock 110. Alternatively, the control and verification logic 120 may be provided as a single centralized circuit in the computer system 100 to which all, or at least a plurality, of the biometric sensors 108 and locks 110 couple. The control and verification logic 120 preferably is implemented as hardware, software, or a combination of both. Further, it is important whether separate control and verification logic 120 is provided in each device to have the biometric security system described herein, a control and verification logic 120 is provided to control access to a group of computer devices (e.g., a group of the servers 104 or a group of the power supplies 108), or a control and verification logic 120 is provided to control access to all lockable devices in the system 100.

Before a person can use a biometric sensor 108 to unlock a lock 110, a "template" associated with the person is loaded into the computer system, such as into the registry 122. The template comprises information pertaining to a person's biometric image that can be used for comparison purposes to verify the authenticity of a user. The templates, for example, are used to verify the authenticity of a person when attempting to open a lock 110. In accordance with a preferred embodiment of the invention, a person can be "registered" to be granted physical access to one or more computer devices. The registration process includes recording a sample biometric image from the person using a sensor 108 to obtain a template. The template may be generated in accordance with known techniques. The registry 122 thus includes biometric templates of registered users.

As part of the process of opening a lock 110 in response to a biometric sensor signal, a user activates a biometric sensor 108 associated with the device to be unlocked. The biometric sensor 108 then provides a signal to the control and verification logic 120 that is representative of the person's biometric identity. The control and verification unit 120 analyzes the signal from the sensor 108 to verify the authenticity of the user. The verification process includes capturing biometric information, processing it, and then comparing the sensor's information to the templates in the registry 122. If a match is found, then that person is considered verified and the lock 110 associated with the sensor 108 that the person used is unlocked (or locked if a seal function is desired and the device is already unlocked) by control and verification unit 120. In this way, physical access to a component of a computer system is restricted to one or more users.

Using the biometric security system described above, physical access to each component can be restricted just to those individuals that require physical access to the component. Thus, for example, a power supply maintenance worker may be registered to physically access one or more of the power supplies 106, but not the other components such as servers 104. This advantage is inherently implemented if each computer component has its own control and verification unit 120 and registry 122. In that case, a template for a person authorized to unlock the component is loaded into the registry 122 associated with that component. Then, when a person activates the biometric sensor associated with a component, the control and verification logic 120 accesses the registry to verify the person against the entries in that registry.

In the case where the control and verification logic 120 is implemented in the form of a centralized piece of logic coupled to a plurality of biometric sensors and locks, the registry may have entries associated with more than one computer component. As such, each entry may have, in addition to a biometric template for a registrant, a security access code. The security access code can be unique to each registrant or be shared among groups of registrants. In general, the security access code indicates which of the biometrically lockable computer components that person can control. The control and verification logic 120 preferably interprets the security codes to verify whether a particular person, via his or her biometric image, is authorized to access a particular component. For example, a person that only needs to work on the power supply units 106 may be assigned a security access code that only permits that person to lock/unlock the power supply units. Thus, persons needing access to only certain subsystems or components can be assigned access codes that permit those persons access to their needed subsystems or components. Further, one or more codes can be assigned that permit access to more than one subsystem or component and further still, other codes can be assigned that permit access to all of the lockable devices in the system. Then, when a person uses a biometric sensor 108 associated with a particular computer device, the control and verification circuit 120 verifies the authenticity of the person by comparing the sensor signal to the templates. If, and when, a match is found, the control and verification circuit 120 examines the security access code to determine if that person is authorized to unlock or lock that particular computer device. If the person is not permitted to activate the lock 110 associated with the computer device, the control and verification circuit 120 will not activate the lock. If the person is permitted to activate the lock 110 associated with the computer device, the control and verification circuit 120 locks or unlocks the lock 110.

In this way, physical access to discrete components or subsystems can be granted to select persons on a "need to access" basis. Alternatively stated, access to a certain component or subsystem can be limited just to those persons needing access to those subsystems.

In addition to limiting physical access to certain components and subsystems, the concepts explained above can be used to limit logical access to various components and subsystems, such as storage devices. "Logical access" is intended to refer to the ability to use the device for its intended purpose. In the context of a storage device, for example, logical access refers to the ability to access the device to read data from or write data to the device. Logical access can also refer to using a component or subsystem such as network monitor or a service or resource provided by a computer system.

The block diagram of FIG. 3 is used to discuss this use of biometrics. It should be appreciated that, in this context, the lock 110 is unnecessary. In its place, for purposes of the following discussion, a computer component or subsystem (e.g., a server or power supply) can be substituted. The control and verification logic 120 and registry 122 can be provided as part of each device use of which is to be restricted. Alternatively, the control and verification logic 120 and registry 122 can be implemented in a centralized fashion to restrict use of more than one computer device or subsystem. Further, each computer component or subsystem may have its own biometric sensor 108 through which a user must be verified to use that component or subsystem, or alternatively, a biometric sensor can be located at other locations at or in conjunction with the system 100. For example, a sensor can be located at a workstation connected to or remotely coupled to the system 100.

As with registering a person to be able to unlock a device, a person authorized to logically use a particular device is registered to use that device by providing a biometric template which is stored in registry 122. Other information in registry 122 may include a list of the device(s) to which the person is permitted logical access. In accordance with a preferred embodiment, a user may physically install a storage device into a system. Using the embodiment described above, that person may have had to be authenticated via a biometric sensor 108 to be able to remove and replace a component. However, the person may or may not be granted logical access to actually use the device. Preferably, the registry 122 is programmed in such a manner to indicate to the system which persons are authorized to use a particular device.

Upon installing the storage device, the user may be prompted to activate the associated biometric sensor 108. If the person's identity is verified, the storage device will be usable. Alternatively, when software program execution first attempts to access a storage device which includes the biometric-based access restriction described herein, a user will be prompted to activate a biometric sensor 108 corresponding to the storage device. While this may be prompted for at the application layer, it preferably is enforced at the drive level. The biometric sensor may be located on the storage device itself or at or near a console or workstation to which the user has access. If the user's biometric image is successfully verified, then program execution continues and the storage device is accessed. If the biometric sensor is located remotely from the computer device to which it pertains, it may be preferred to encrypt the biometric information being provided to the control and verification logic 120 to minimize the possibility of an unauthorized person intercepting the biometric information.

Further, the registration information for a person in the registry 122 may specify that the person may be granted access to only a portion of the information stored on a storage device. In this way, access to certain information may be restricted to particular individuals, while other information (even information on the same drive) may be accessed by additional or different people.

The above discussion is meant to be illustrative of the principles and various embodiments of the present invention. Numerous variations and modifications will become apparent to those skilled in the art once the above disclosure is fully appreciated. For example, a single biometric sensor can be provided to permit physical and logical access to multiple classes of hardware. In this way, for example, one biometric sensor can control all disks, tapes, CDs, memory and, depending on a user's credentials, can unlock or enable one or all devices. It is intended that the following claims be interpreted to embrace all such variations and modifications.

What is claimed is:

1. A computer system, comprising:
   a computer component;
   a biometric sensor;
   a control unit coupled to said biometric sensor;
   a lock coupled to and controlled by said control unit, wherein the control unit operates the lock by authenticating biometric data received from the biometric sensor; and
   a registry stored in a memory accessible by said control unit, said registry including a first access code and a second access code,
   wherein the lock prevents the computer component from being removed from the computer system unless the control unit authenticates biometric data received from the biometric sensor and obtains the first access code from the registry;
   wherein logical access to the computer component is prevented unless the control unit authenticates biometric data received from the biometric sensor and obtains the second access code;
   wherein the first access code enables physical access to the computer component, but not logical access: and
   wherein the second access code enables logical access to the computer component, but not physical access.

2. The computer system of claim 1 wherein the biometric sensor comprises a fingerprint scanner.

3. The computer system of claim 1 wherein the biometric sensor comprises an iris scanner.

4. The computer system of claim 1 wherein the lock comprises an electromechanical lock.

5. The computer system of claim 1 wherein said control unit verifies the authenticity of a person that has activated one of the plurality of biometric sensors based on biometric templates stored in said registry.

6. The computer system of claim 5 wherein said control unit unlocks the lock if said control unit successfully verifies biometric data of a first person and wherein said control unit grants logical access to the computer component if said control unit successfully verifies biometric data of a second person.

7. The computer system of claim 1 wherein said control unit maintains the lock in a locked state if said control unit cannot verify the authenticity of a person.

8. The computer system of claim 1 further comprising a plurality of biometric sensors and a plurality of computer components wherein each of said plurality of biometric sensors is associated with a corresponding one of said plurality of computer components.

9. A security method for a computer system including a plurality of computer components, comprising:
   registering a first user's biometric to access a computing component logically;
   registering a second user's biometric to access the computer component physically;
   authenticating a user identity using biometrics;
   if the user identity is authenticated as the first user, permitting logical access to the computer component, but not physical access; and
   if the user identity is authenticated as the second user, permitting physical access to the computer component, but not logical access.

10. The method of claim 9 wherein authenticating a user identity using biometrics comprises using a fingerprint sensor.

11. The method of claim 9 wherein authenticating a user identity using biometrics comprises using a iris scanner.

12. The method of claim 9 wherein at least one of said computer components comprises a storage device.

13. The method of claim 9 wherein at least one of said computer components comprises a storage device and wherein permitting logical access to the computer component comprises permitting a user to read data from but not write data to said storage device.

14. The method of claim 9 wherein at least one of said computer components comprises a storage device and wherein permitting logical access to the computer component comprises permitting a user to write data to but not read data from said storage device.

15. The method of claim 9 wherein at least one of said computer components comprises a storage device and wherein permitting logical access to the computer component comprises permitting a user to read data from and write data to said storage device.

16. The method of claim 9 wherein at least one of said computer components comprises a CD ROM.

17. The method of claim 9 wherein at least one of said computer components comprises a hard disk drive.

18. The method of claim 9 wherein said authenticating a user identity using biometrics is performed when a software program needs to access one of said computer components.

19. The method of claim 18 wherein at least one of said computer components comprises a storage device.

20. The method of claim 9 further comprising acquiring a user's biometric image and associating a security access code with said biometric image.

21. A biometric access system for a computer system that includes a plurality of computer devices, comprising:
   a plurality of biometric sensors; and
   a control unit coupled to said plurality of biometric sensors, said control unit selectively controlling logical access and physical access to the plurality of computer devices in said computer system based on signals from one or more of said biometric sensors;
   wherein the control unit selectively enables a first user to have logical access to at least one of the computer devices, but not physical access;
   wherein the control unit selectively enables a second user to have physical access to at least one of the computer devices, but not logical access.

22. The biometric access system of claim 21 wherein at least one of said plurality of biometric sensors comprises a fingerprint scanner.

23. The biometric access system of claim 21 wherein at least one of said biometric sensors comprises an iris scanner.

24. The biometric access system of claim 21 wherein said control unit permits a person to access one of said plurality of computer devices based on a signal from the biometric sensor associated with the computer device that the person is trying to access.

25. The biometric access system of claim 21 wherein said control unit prevents a person from accessing one of said plurality of computer devices based on a signal from its associated biometric sensor.

26. The biometric access system of claim 21 further including a registry accessible by said control unit, said registry including biometric templates of people that are permitted use of various of said computer devices.

27. The biometric access system of claim 26 wherein said control unit verifies the authenticity of a person that has activated a biometric sensor by using the templates stored in said registry.

28. The biometric access system of claim 27 wherein said control unit permits a user to use one of said plurality of computer devices if said control unit successfully verifies the authenticity of a person.

29. The biometric access system of claim 28 wherein at least one of said plurality of computer devices comprises a storage device.

30. The biometric access system of claim 27 wherein said control unit prevents a user from using one of said plurality of computer devices if said control unit cannot verify the authenticity of the person.

31. The biometric access system of claim 21 wherein at least one of the computer devices comprises a storage device.

32. A security system for a server rack, said security system comprising:
   a biometric sensor;
      a control unit coupled to said biometric sensor; and
      a lock coupled to and controlled by said control unit;
      wherein the control unit selectively controls the lock to allow physical removal of a server based on data received from the biometric sensor,
      wherein the control unit selectively controls logical access to the server based on data received from the biometric sensor,
      wherein the control unit selectively enables a first user to have logical access to the server, but not physical access;
      wherein the control unit selectively enables a second user to have physical access to the server, but not logical access.

33. A security system as defined in claim 32, wherein the biometric sensor is located remotely from the server rack.

34. A security system as defined in claim 32, further comprising:
   a rack for holding a plurality of servers.

35. A security system as defined in claim 34, further comprising a plurality of locks to secure each of a plurality of servers to the rack.

36. A security system as defined in claim 32, further including a registry stored in memory accessible by said control unit, said registry including a template for each person authorized to unlock the lock.

37. A security system as defined in claim 36, wherein said control unit verifies the authenticity of a person that has activated the biometric sensor by using the templates stored in said registry.

38. A security system as defined in claim 32, wherein the biometric sensor is selected from among a fingerprint sensor and an iris scanner.

* * * * *

UNITED STATES PATENT AND TRADEMARK OFFICE
CERTIFICATE OF CORRECTION

PATENT NO. : 7,167,987 B2 Page 1 of 1
APPLICATION NO. : 09/942352
DATED : January 23, 2007
INVENTOR(S) : Michael F. Angelo It is certified that error appears in the above-identified patent and that said Letters Patent is hereby corrected as shown below:

On the Title Page Item (56), after "Foreign Patent Documents",
below the entry "JP   411229687 A   *   2/1998 ............70/1"
insert -- OTHER PUBLICATIONS
Save time. Save Money. A foolproof method to increase site security,
2002 Identix Incorporated; [online]. Retrieved from the
Internet:<URL:http://www.identix.com/products/pro_access.html (lp.).

A secure solution for any organization, 2002 Identix Incorporated; [online]. Retrieved
from the Internet:<URL: http://www.identix.com/products/pro_access_fv20.html (lp.). --.

In column 1, line 31, after "Each of" insert -- these --.

In column 7, line 25, in Claim 1, after "access" delete ":" and insert -- ; --, therefor.

Signed and Sealed this

Thirty-first Day of March, 2009

JOHN DOLL
*Acting Director of the United States Patent and Trademark Office*